United States Patent [19]
DePriester et al.

[11] 3,942,600
[45] Mar. 9, 1976

[54] LIFT TRUCK WITH MUFFLER IN OVERHEAD GUARD

[75] Inventors: Donald J. DePriester; Neal J. Marks, both of Niles, Mich.

[73] Assignee: Clark Equipment Company, Buchanan, Mich.

[22] Filed: Nov. 27, 1974

[21] Appl. No.: 527,661

[52] U.S. Cl. ............................ 180/64 A; 280/150 C
[51] Int. Cl.² .......................................... B60K 13/04
[58] Field of Search ............... 180/64 A; 280/150 C

[56] References Cited
UNITED STATES PATENTS
2,242,494   5/1941   Wolf ........................... 180/64 A X FOREIGN PATENTS OR APPLICATIONS
750,170   6/1956   United Kingdom ............... 180/64 A
743,439   12/1943   Germany ........................... 180/64 A Primary Examiner—Robert R. Song
Assistant Examiner—Milton L. Smith
Attorney, Agent, or Firm—John C. Wiessler

[57] ABSTRACT

A lift truck in which the engine exhaust conduit extends upwardly along one side of the overhead safety guard and which is connected to a muffler extending transversely of the upper rear portion of the overhead guard and located in nested relation thereto.

6 Claims, 3 Drawing Figures

LIFT TRUCK WITH MUFFLER IN OVERHEAD GUARD

This invention relates to improvements in vehicle exhaust systems, and more particularly to improvements in the location and mounting of exhaust systems in certain types of industrial vehicles.

Our invention satisfies three important objectives in vehicle exhaust systems as follows:

To reduce air pollution in the vicinity of a vehicle, whether operating indoors or outdoors, by elevating the point of exhaust;

To improve exhaust system cooling by locating the exhaust conduit and muffler outside of any vehicle enclosure so that improved radiant and air flow cooling occurs; and To conserve engine compartment space.

Figure 1:
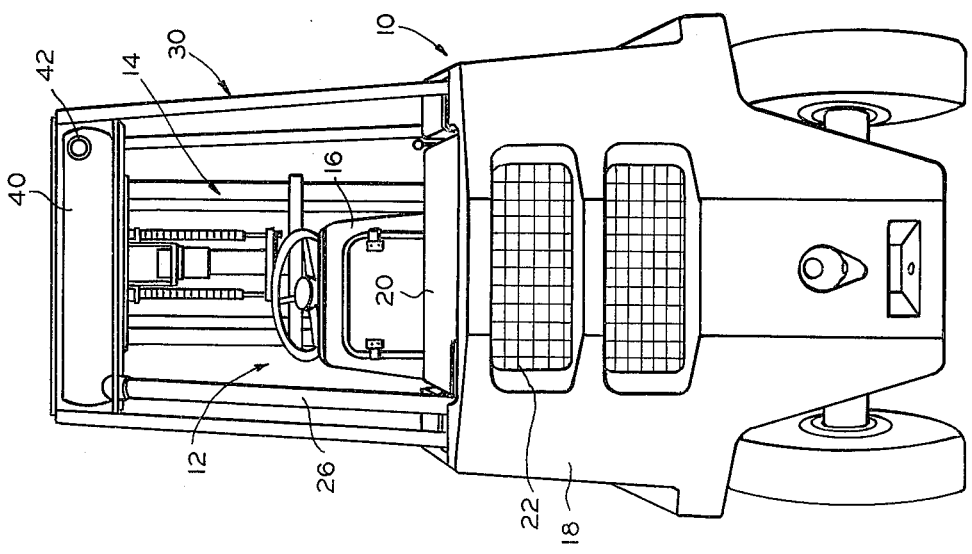
FIG. 1 is a rear view of an industrial lift truck which embodies our invention.
Figure 2:
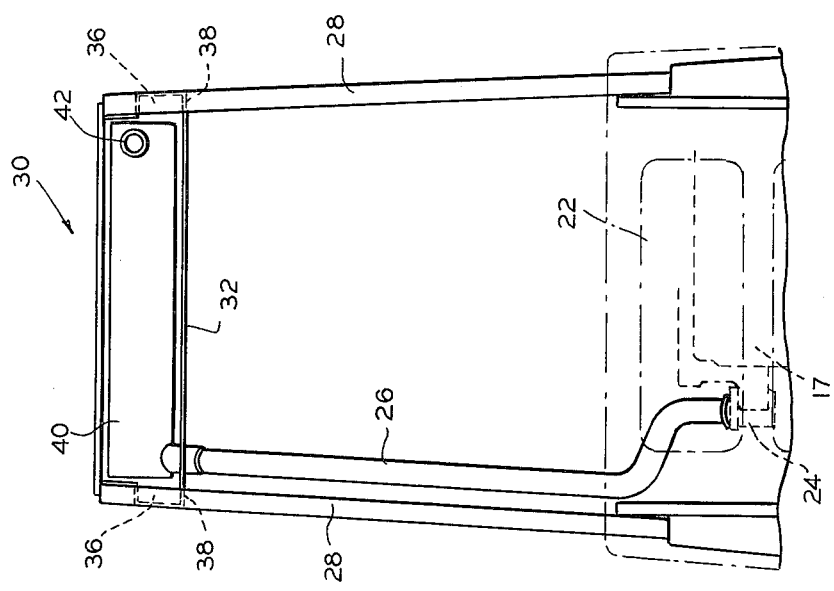
FIG. 2 is an enlarged broken-away view, partially in phantom view, of a portion of FIG. 1.

An industrial lift truck is shown at numeral 10 having an operator's station 12, a telescopic upright assembly 14 mounted from the front end thereof, an engine compartment 17 located rearwardly of an operator's seat 16, forwardly of a counterweight 18 and enclosed by a cover hood 20. The drive train is mounted in a conventional manner for front wheel drive, a radiator being mounted at the rear of the truck forwardly of openings 22 in the counterweight. An exhaust manifold is shown at 24 connected to which is an upwardly extending tail pipe 26 which preferably extends substantially parallel to and along one side of one of the rear vertical legs 28 of an overhead guard assembly 30 mounted from the front and rear portions of the truck in a well-known manner and including an overhead canopy guard 29 of known construction for protecting the operator from falling objects.

Figure 3:
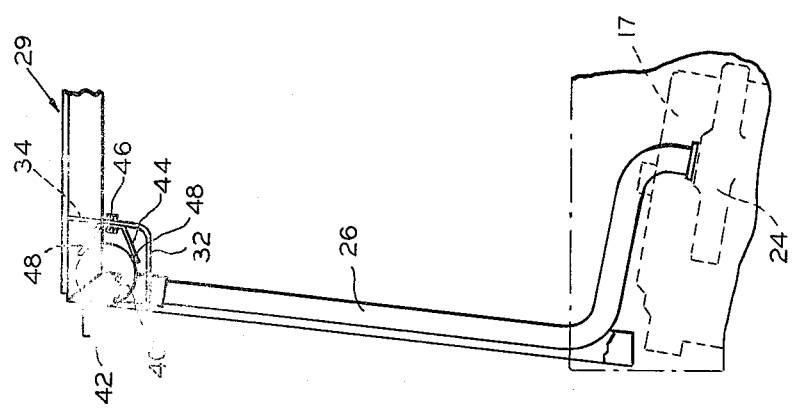
FIG. 3 is a broken-away side view, partially in phantom view, of FIG. 2.

A transversely extending rearwardly opening muffler recess is formed in the overhead guard transversely of the upper rear portion thereof by an angle bracket 32 which is secured, as by welding, along the upper edge 34 thereof to the guard canopy and to the ends thereof by projections 36 which extend into openings 38 in the rear guard legs. A muffler assembly 40 is located in the recess in position as shown preferably with clearance from all surrounding surface metal portions to facilitate the circulation of cooling air around the muffler during operation, the exhaust of which is located at 42. The muffler is held in position by means of a pair of generally V or U-shaped brackets 44 welded in transversely spaced relation behind the muffler and secured to the vertical leg of bracket 32 by bolts 46, one of which is shown in FIG. 3, which is connected to the base of each bracket 44, the legs of which are secured as by welding to the body of the muffler at 48.

From the foregoing description it will be apparent to persons skilled in the art that our novel construction effects the three earlier stated objectives by utilizing an elevated muffler construction suitably mounted in the upper rear portion of the overhead guard of an industrial lift truck. The invention is, of course, applicable to other types of vehicles wherein a similar type of mounting is available and which would effect such advantageous results.

It will be apparent to those skilled in the art that various changes in the structure and relative arrangement of parts may be made without necessarily departing from the scope of our invention.

We claim:

1. In an industrial truck having an engine and an operator's compartment, an overhead guard extending over the operator's compartment, means forming a recess at the top rear portion of the guard which extends transversely of the guard, a muffler located in the recess being supported in said recess out of contact with the means which form the recess, a tail pipe extending upwardly along one side of the overhead guard to connect the one end of the muffler to the engine, and a muffler exhaust element located adjacent the opposite side of the guard.

2. A device as claimed in claim 1 wherein the means forming said recess substantially surround the muffler excepting at the rear side thereof.

3. A device as claimed in claim 2 wherein bracket means support the muffler within the means which defines the recess in such a manner that the muffler is held out of contact with the recess defining means thereby facilitating the circulation of cooling air in the vicinity of the muffler.

4. A device as claimed in claim 3 wherein said bracket means comprise a generally V or U-shaped element, the legs of which are secured to the muffler which nests at least partially therein.

5. A device as claimed in claim 2 wherein said recess forming means comprise wall means.

6. A device as claimed in claim 1 wherein the muffler is connected to rear supporting legs of the overhead guard by projections which extend into openings of said legs.

* * * * *